United States Patent
Laghezza et al.

(10) Patent No.: US 11,294,031 B2
(45) Date of Patent: Apr. 5, 2022

(54) METHOD AND SYSTEM FOR HEIGHT ESTIMATION IN ULTRA-SHORT-RANGE RADAR

(71) Applicant: NXP B.V., Eindhoven (NL)

(72) Inventors: Francesco Laghezza, Eindhoven (NL); Feike Guus Jansen, Eindhoven (NL)

(73) Assignee: NXP B.V., San Jose, CA (US)

( * ) Notice: Subject to any disclaimer, the term of this patent is extended or adjusted under 35 U.S.C. 154(b) by 351 days.

(21) Appl. No.: 16/512,988

(22) Filed: Jul. 16, 2019

(65) Prior Publication Data

US 2021/0018592 A1  Jan. 21, 2021

(51) Int. Cl.
*G01S 7/41* (2006.01)
*G01S 13/931* (2020.01)

(52) U.S. Cl.
CPC .............. *G01S 7/41* (2013.01); *G01S 13/931* (2013.01)

(58) Field of Classification Search
CPC ................................. G01S 7/41; G01S 13/931
See application file for complete search history.

(56) References Cited

U.S. PATENT DOCUMENTS

| | | | |
|---|---|---|---|
| 7,623,061 B2 | 11/2009 | Spyropulos et al. | |
| 2013/0002470 A1* | 1/2013 | Kambe | G01S 13/867 342/55 |
| 2015/0301159 A1* | 10/2015 | Scheschko | H01Q 15/18 342/174 |
| 2018/0259634 A1* | 9/2018 | Okamoto | G01S 13/931 |
| 2020/0225337 A1* | 7/2020 | Kishigami | G01S 13/42 |

FOREIGN PATENT DOCUMENTS

| | | |
|---|---|---|
| DE | 19801617 A1 | 7/1999 |
| DE | 102015009382 A1 | 1/2016 |
| DE | 102015012589 A1 | 3/2016 |
| DE | 102016013939 A1 | 5/2017 |
| DE | 102016014060 A1 | 6/2017 |
| DE | 102016014060 A1 | 6/2017 |

OTHER PUBLICATIONS

Laribi, Amir et al., "Vertical Digital Beamforming Versus Multipath Height Finding", 2017 IEEE MTT-S International Conference on Microwaves for Intelligent Mobility (ICMIM), Mar. 19, 2017, pp. 99-102, IEEE, Piscataway, NJ, USA.
Laribi et al., "A New Height-Estimation Method Using FMCW Radar Doppler Beam Sharpening," 25th European Signal Processing Conference EUSIPCO 2017, pp. 1932-1936.
Laribi et al. "A Novel Target-Height Estimation Approach Using Radar-Wave Multipath Propagation for Automotive Applications," Adv. Radio Sci, v.15, pp. 61-67 (2017).
Diewald et al., "Radar-Interference-Based Bridge Identification for Collision Avoidance Systems," 2011 IEEE Intelligent Vehicles Symposium (IV), pp. 113-118 (2011).

* cited by examiner

*Primary Examiner* — Donald H B Braswell (57) ABSTRACT

A mechanism is provided to determine if a short-range automotive radar detection is a direct reflection or an indirect (also known as "multipath") reflection from a physical target object. The multipath information is further used to perform a height estimation of the object. Embodiments provide a radar system having a range resolution smaller than a path difference between the direct reflection path and the indirect reflection path. Both range separation techniques and Doppler separation techniques are utilized to provide a reliable and accurate estimation of the height of the object.

22 Claims, 10 Drawing Sheets

METHOD AND SYSTEM FOR HEIGHT ESTIMATION IN ULTRA-SHORT-RANGE RADAR

BACKGROUND

Field

This disclosure relates generally to automotive radar, and more specifically, to height estimation for ultra-short-range radar.

Related Art

Radar sensors play a significant role in development of automated and autonomous driving concepts and applications. Radar sensor usage is expected to continue to grow in the coming years, along with safety and security concerns. For example, objects that are likely to be detected in automotive radar applications are close to the ground, and as such can provide not only direct reflection of radar signals but also bounce indirect, reflected radar signals off the ground. These indirect radar reflections can be misinterpreted as real objects to be avoided by a vehicle.

In addition, while performing autonomous driving tasks, a challenge is to determine, using radar sensors, whether the autonomous vehicle can drive over, under, or through certain objects in the driving direction or maneuvering area of the vehicle. In order to make this determination, a height of objects in the path of the vehicle needs to be determined. Typically, determining a height of an object is difficult for radar sensors because detection in the driving direction contains insufficient information to determine height. This lack of information is due to limited angular resolution of radar signals in the elevation direction. While achieving elevation separability can be possible using a planar array radar configuration, complexity and variability of the various scenarios encountered by a vehicle make it very difficult to address with a single array configuration.

It is therefore desirable to determine which reflections received by an automotive radar are direct and which are indirect, thereby ensuring association of received radar reflection signals with a correct object. It is further desirable to provide height estimation of objects in a vehicle's path, without provision of specialized array configurations, using a limited number of antennas in the elevation plane.

BRIEF DESCRIPTION OF THE DRAWINGS

Embodiments of the present invention may be better understood by referencing the accompanying drawings.

The use of the same reference symbols in different drawings indicates identical items unless otherwise noted. The figures are not necessarily drawn to scale.

DETAILED DESCRIPTION

Embodiments of the present invention provide a mechanism to determine if a short-range automotive radar detection is a direct reflection or an indirect (also known as "multipath") reflection from a physical target object. The multipath information is further used to perform a height estimation of the object. Embodiments provide a radar system having a range resolution smaller than a path difference between the direct reflection path and the indirect reflection path. Both range separation techniques and Doppler separation techniques are utilized to provide a reliable and accurate estimation of the height of the object.

While it is desirable to have information regarding height of objects in the driving path of an automated vehicle, this is not an easy task for automotive radar since detection in the driving direction does not typically contain information about height. This is due, in part, to limited angular resolution of the radar signal in the elevation direction. Therefore, alternative mechanisms to derive height information are needed. Extracting additional information from a radar signal having sufficient resolution can provide a height estimation with a reduced number of antennas thereby reducing system complexity. Embodiments of the present invention utilize digital signal processing techniques and a limited number of radar antennas in the elevation plane to provide an estimate of object height.

Embodiments of the present invention exploit the ground multipath effect to derive object height information from radar reflections. In order to perform this task, the range/velocity resolution of the radar should be high. For radars in which range/velocity resolution is not necessarily high, multipath components fold in the same range/velocity bin of the main signal detection, which creates a power fading effect due to different phase information. This power fading over time can be exploited to retrieve information about height of an object. In order to perform this estimation, an understanding of radar back scattering intensity modulation over a reciprocal distance of the object is needed.

For short and ultra-short-range radars, high range resolution is desirable. High velocity resolution is also desirable due to lower speeds of the vehicle for short range applications. In situations involving high resolution radar signals, the multipath signal component can be separated from the direct path signal component, using both range (distance) and Doppler (velocity) separation techniques, to enable height estimation.

Range separation techniques assume that a ground reflection signal path has a different length than a direct reflection signal path over a distance between a radar sensor and an object being detected (i.e., the ground reflection signal path is longer). This accounts for a height of the radar sensor mounting position and a height of the object being detected. With a radar having a high range resolution, the system can determine a length difference between the two paths and height information can be calculated.

Doppler separation techniques, which are also known as Doppler beam sharpening, assume that the ground reflection path will have a different elevation angle than the direct reflection path. If the vehicle including the radar sensor is in motion, then the velocity of objects with respect to the vehicle can be measured using Doppler radar. With differing angles between the direct and indirect reflection paths, the velocity component along the paths will also be different. With a sufficient system velocity resolution, the difference between a direct reflection velocity component and a multipath velocity component can be used to retrieve and elevation angle and thus the height of the object.

In a typical scenario where there are several objects being detected, a range-Doppler mapping can contain many reflection signals. There will be difficulties in distinguishing between direct reflection signals and multipath reflection signals, and thus which signals represent a location of a target object. There may also be multiple indirect reflections generated by a single object. It can therefore be difficult to determine associations between direct reflection signals and multipath reflection signals to clean up the mapping.

Embodiments of the present invention provide a mechanism for effectively associating direct reflection signals and multipath reflection signals. In addition, embodiments provide a fusion of range separation and Doppler separation techniques to increase reliability and precision of height estimation provided by the system.

Figure 1:
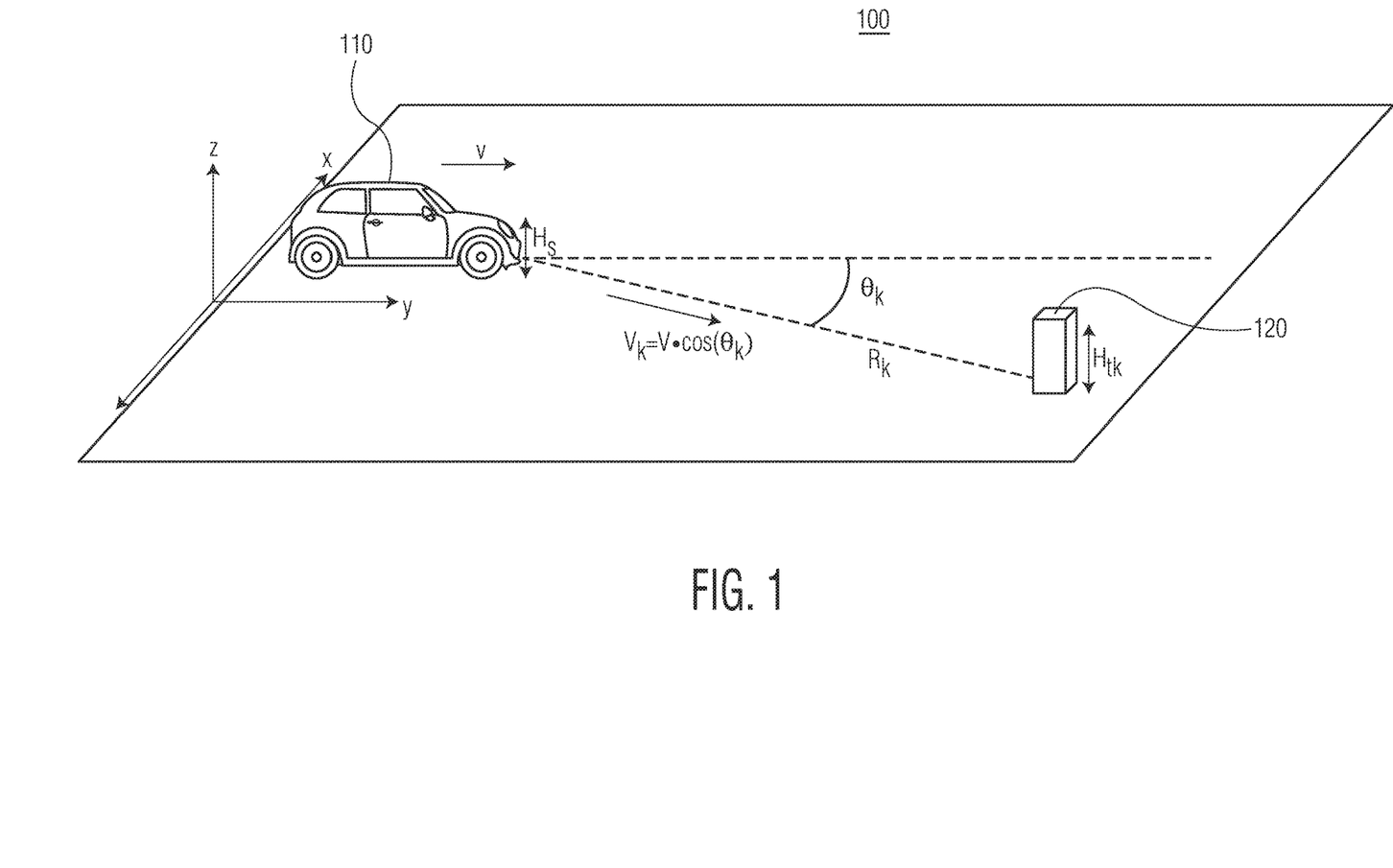
FIG. 1 is a block diagram illustrating a simple example scenario 100 of automobile radar usage in a perspective view.

FIG. 1 is a block diagram illustrating a simple example scenario 100 of automobile radar usage in a perspective view. In a vehicle 110, a radar sensor is mounted at a fixed height $H_s$. Vehicle 110 is moving at a velocity v along the y-axis having a velocity component $v_k = v^* \cos(\Theta_k)$ toward a target object 120 having a height $H_{tk}$. Target object 120 is at a distance $R_k$ from the vehicle at an azimuth angle $\Theta_k$ with respect to the radar sensor's boresight in the xy-plane.

Figure 2:
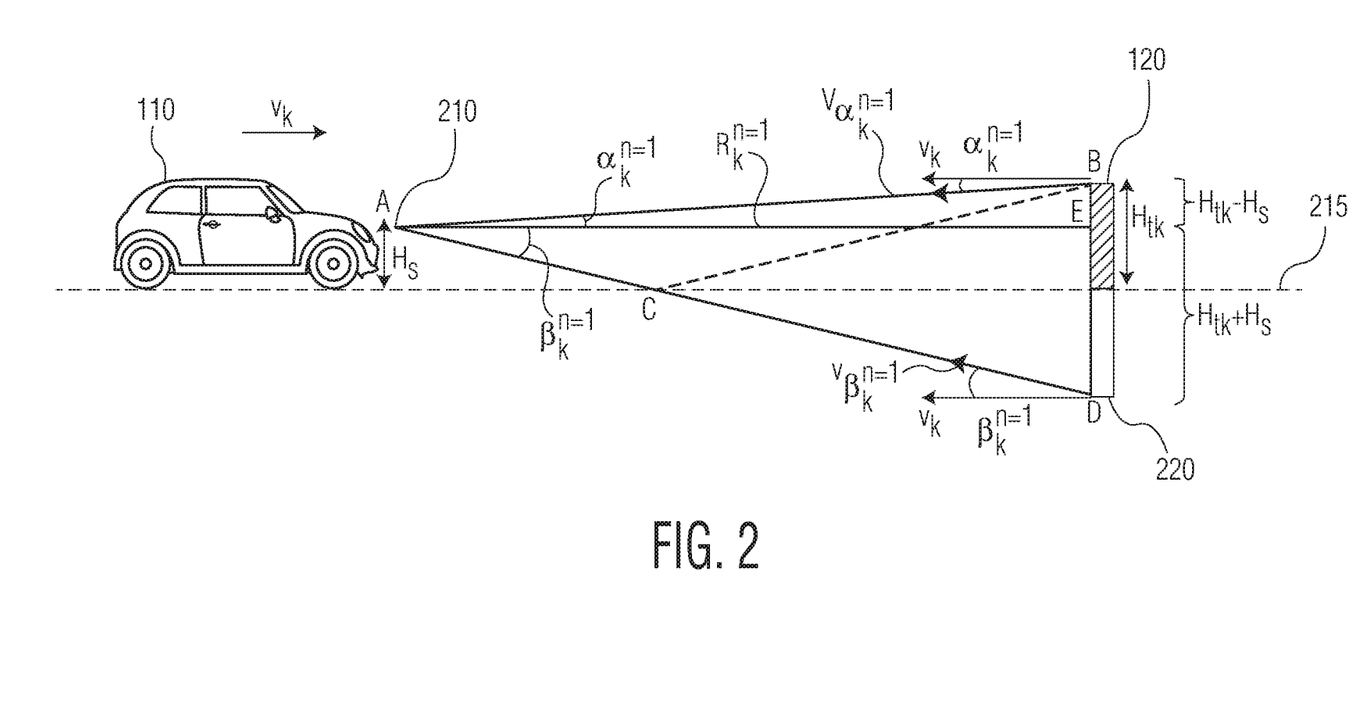
FIG. 2 is a simplified block diagram illustrating the example scenario of automotive radar usage of FIG. 1 in the yz-plane.

FIG. 2 is a simplified block diagram illustrating the example scenario of automotive radar usage of FIG. 1 in the yz-plane. FIG. 2 provides a snapshot of the scenario as vehicle 110 is approaching target object 120 at a time n=1. "n" is a time reference in this and further illustrations below. "k" is a designation for the target object 120.

Radar sensor 210 receives a reflected signal from target object 120 through both direct and indirect paths. A two-way direct path is from point A (radar sensor 210) to point B (top of target object 120) and back from point B to point A, which has a length ABA. The length of AB is provided by the following equation, in light of a perpendicular, radial distance from radar sensor 210 to target object 120 ($R_k^{n=1}$ in equation) and a difference between the height of the target object ($H_{tk}$) and the height of the radar sensor on the car ($H_s$).

$$AB = \sqrt{(R_k^{n=1})^2 + (H_{tk} - H_s)^2} \approx R_k^{n=1} + \frac{(H_{tk} - H_s)^2}{2R_k^{n=1}}$$

The indirect path is from point A to point B, and then from point B to point C (a reflection point on the ground 215) and back to point A. While the radar can receive reflected signal from the entire face of the target object, indirect path ABCA provides the most powerful deflection signal from the target object. As illustrated, the length of BCA is equal to a path AD, where point D is an image 220 of target object 120 as if ground 215 were a mirror. The multipath reflection length BCA in light of the radial distance from radar sensor 210 to target object 120 and a "height" of image 220 ($H_{tk}+H_s$) is $$BCA = AD = \sqrt{(R_k^{n=1})^2 + (H_{tk} + H_s)^2} \approx R_k^{n=1} + \frac{(H_{tk} + H_s)^2}{2R_k^{n=1}} = R_{k,m}^{n=1}$$

The angle $\alpha$ between the direct path (AB) and the radial line between radar sensor 210 and target object 120 (AE) and the angle $\beta$ between the indirect path (AD) and radial line are:

$$\alpha_k^{n=1} = a\tan((H_{tk} - H_s)/R_k^{n=1})$$

$$\beta_k^{n=1} = a\tan((H_{tk} + H_s)/R_k^{n=1})$$

These angular equations allow for a determination of the components of velocity $v_k$ along both the direct path AB and the indirect path AD:

$$v_{\alpha_k}^{n=1} = v_k^{n=1} \cdot \cos(\alpha_k^{n=1})$$

$$v_{\beta_k}^{n=1} = v_k^{n=1} \cdot \cos(\beta_k^{n=1})$$

Since the lengths of the direct and indirect reflection paths are different, with the indirect reflection path generally being longer, a time for the indirect reflection signal to arrive at the radar sensor will be different. In order to distinguish between the direct and reflected signals, the range resolution of radar sensor 210 should be smaller than the difference between the reflected signals. In which case, two detections for target object 120 will be recorded at different ranges in a three-dimensional mapping. In addition, in light of the angle $\beta$, in general, being greater than the angle $\alpha$, a difference between the velocity components along those paths can be determined if the velocity resolution of radar sensor 210 is sufficient.

The height information associated with target object 120 can be determined in light of the difference between the direct and indirect path lengths ($\Delta R$), such that height $H_{tk}$ is:

$$H_{tk} = \frac{\Delta R \cdot R_k^{n=1}}{2H_s}$$

Thus, height $H_{tk}$ depends upon the actual range of detection as well as the height of the radar sensor $H_s$.

Similarly, height $H_{tk}$ can also be calculated in light of the velocity projections along the direct and indirect paths from Doppler sensing.

$$H_{tk} = H_s - \frac{R_{k,m}^{n=1} \sin(a\cos(v_{r,m}))}{v_{r,d}}$$

For additional accuracy, ego motion compensation can be applied to this data, if needed.

Figure 3:
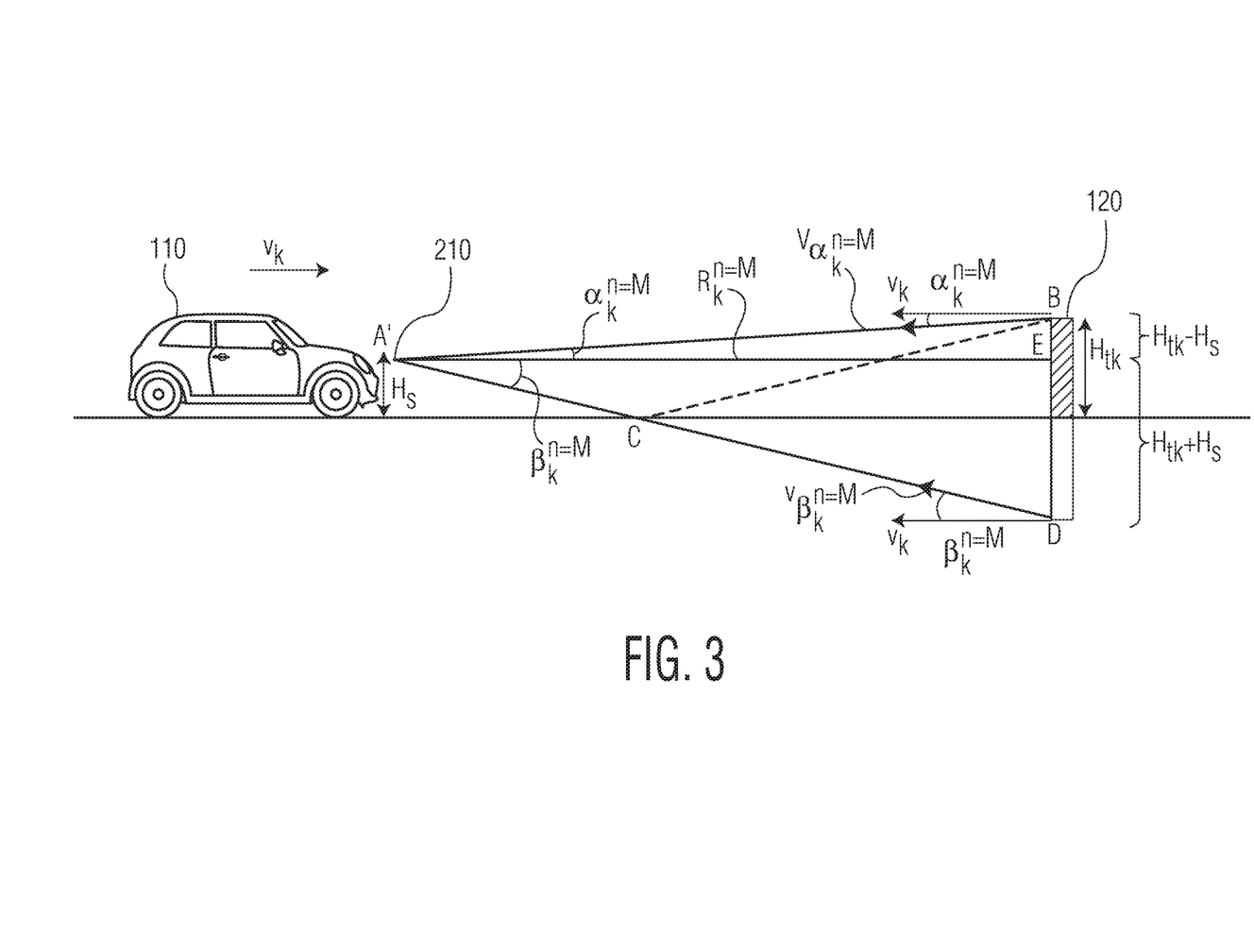
FIG. 3 is a simplified block diagram illustrating the example scenario 100 of automotive radar usage of FIG. 1 in the yz-plane but at a subsequent time n=M to that illustrated in FIG. 2.

FIG. 3 is a simplified block diagram illustrating the example scenario 100 of automotive radar usage of FIG. 1 in the yz-plane but at a subsequent time n=M to that illustrated in FIG. 2. Both the direct and indirect reflection paths are changed, as well as the angles $\alpha$ and $\beta$. Due to the movement of vehicle 110 toward target object 120, the radial distance between sensor 210 and the target object $R_k^{n=M}$ is smaller than for time n=1. The path distances and relative angles and velocity components at time n=M are represented by the following equations:

$$A'B = \sqrt{(R_k^{n=M})^2 + (H_{tk} - H_s)^2} \approx R_k^{n=M} + \frac{(H_{tk} - H_s)^2}{2R_k^{n=M}}$$

$$BC'A' = A'D = \sqrt{(R_k^{n=M})^2 + (H_{tk} + H_s)^2} \approx R_k^{n=M} + \frac{(H_{tk} + H_s)^2}{2R_k^{n=M}}$$

$$\alpha_k^{n=M} = a\tan((H_{tk} - H_s)/R_k^{n=M})$$

$$\beta_k^{n=M} = a\tan((H_{tk} + H_s)/R_k^{n=M})$$

$$v_{\alpha_k^{n=M}} = v_k^{n=M} \cdot \cos(\alpha_k^{n=M})$$

$$v_{\beta_k^{n=M}} = v_k^{n=M} \cdot \cos(\beta_k^{n=M})$$

Figure 4:
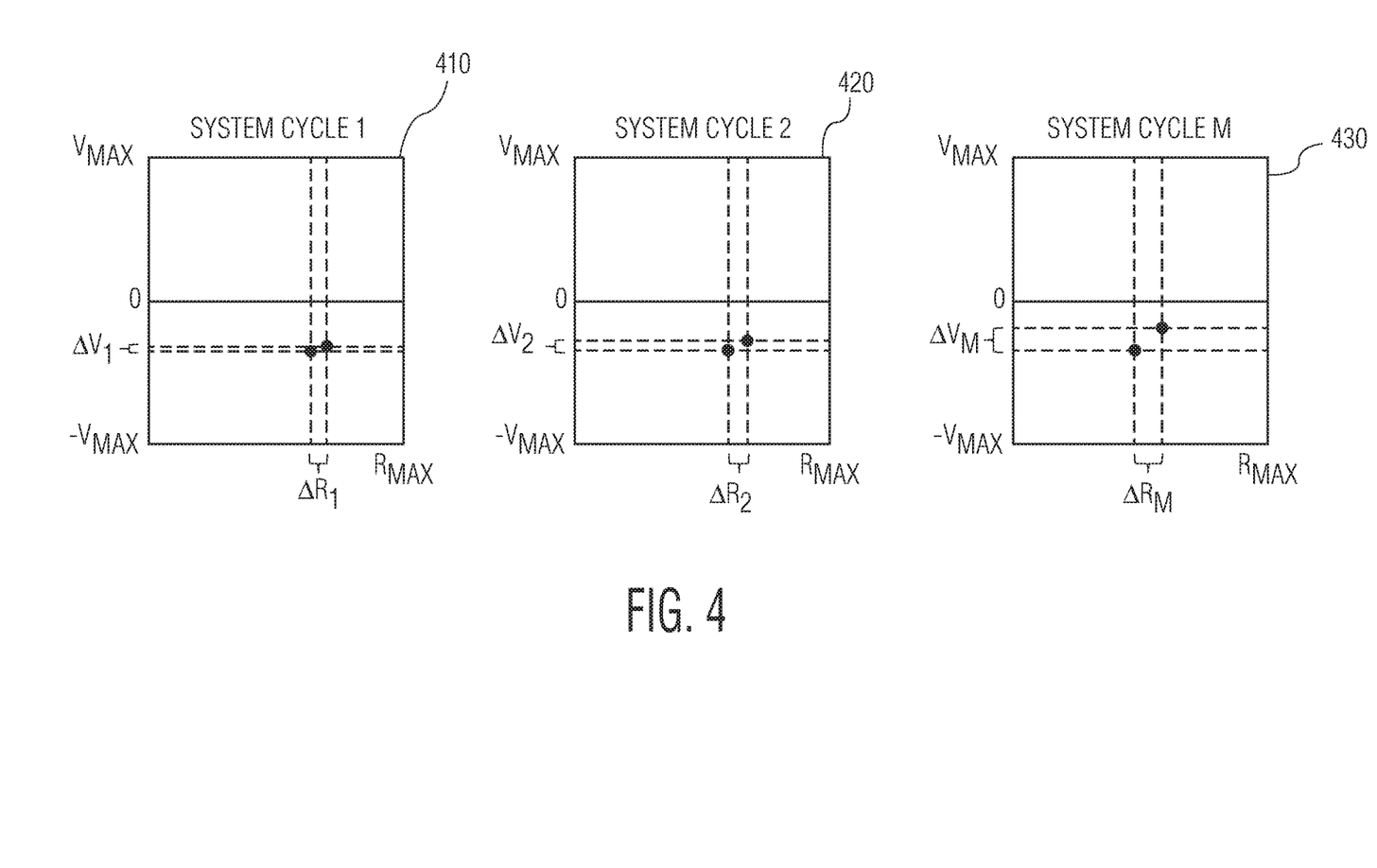
FIG. 4 is a set of graphs illustrating changes in the direct path and indirect path range difference and velocity component difference at different time steps as a radar sensor approaches a target object.

FIG. 4 is a set of graphs illustrating changes in the direct path and indirect path range difference and velocity component difference at different time steps as a radar sensor approaches a target object. As a radar sensor approaches the target object, for a non-accelerating radar, the indirect path range as well as the indirect path angle become greater with respect to previous system time cycles. On the other hand, the direct path range changes at a rate according to the velocity of a vehicle including the radar sensor, while the direct path angle tends to stay more or less the same. Due to these changes, the range difference between the direct and indirect path increases over time. More generally, the direct path reflection changes according to an ego-velocity of the radar sensor in a less strong way than does the indirect path reflection changes. This is due to a smaller angle between the normal and direct path than the angle between the normal and indirect path (e.g., $\alpha_k$ and $\beta_k$ in FIGS. 2 and 3). This is illustrated in FIG. 4 by an increasing $\Delta Rn$ for the time steps in 410 (n=1), 420 (n=2), and 430 (n=M) as the vehicle approaches the target object. At the same time, the velocity component along the indirect path decreases with respect to the velocity component along the direct path, which generally tends to be the same due to the changing angles. The velocity component along the indirect path tends toward zero as the distance between the radar sensor and the target object becomes very small (i.e., the indirect path angle tends toward $\pi/2$). This is illustrated in FIG. 4 by an increasing velocity difference ($\Delta Vn$) for the time steps in 410, 420, and 430.

Figure 5:
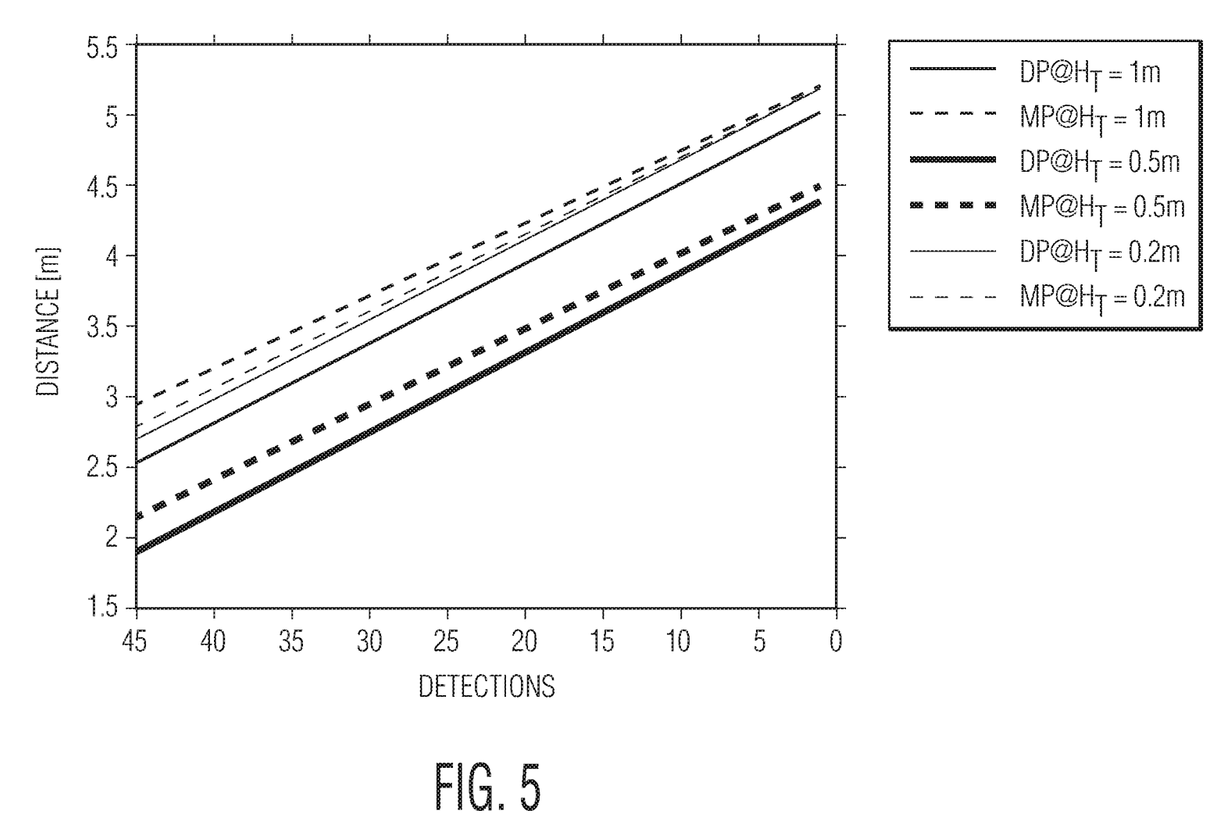
FIG. 5 illustrates a graph showing direct path and indirect path range evolution over time.
Figure 6:
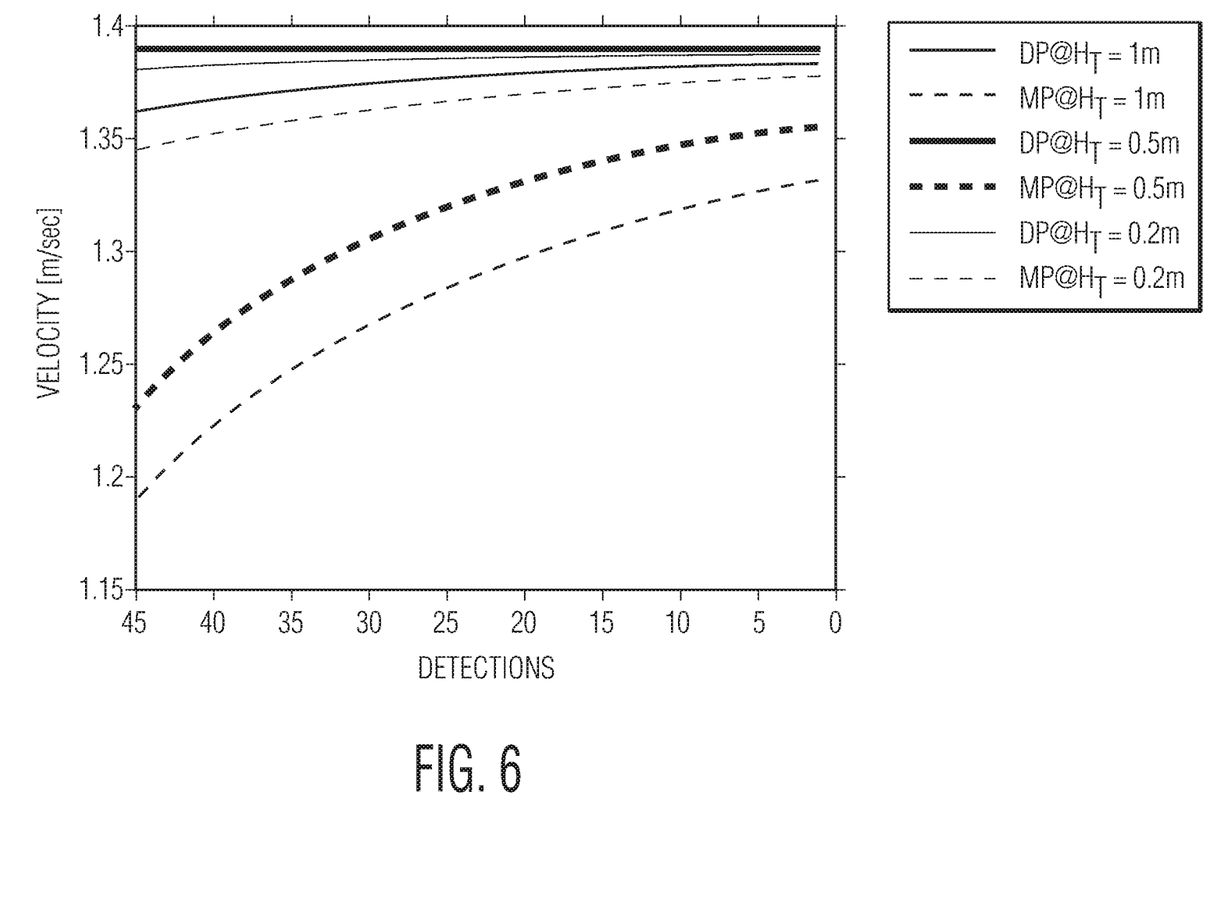
FIG. 6 illustrates a graph showing direct path and indirect path velocity evolution over time.

The relationships between the direct path reflection range and velocity values and the multipath reflection range and velocity values over time are features that can be used to reliably associate a particular ground reflection signal with a direct reflection signal and to therefore clean a signal mapping and to extract height information. An example of how range and velocity differ between the direct and indirect paths for different height objects is represented in FIGS. 5 and 6. In the example, similar to the scenario illustrated above, a vehicle having a front mounted radar sensor is approaching a target object.

FIG. 5 illustrates a graph showing direct path and indirect path range evolution over time. As the vehicle approaches the target object (e.g., the detection number is increasing), the denominator of the equation for $\Delta R$ decreases (see below), which leads to an increase in the differential distance between a direct path (e.g., a solid line in the figure) and a ground reflection path (e.g., a dashed line in the figure).

$$\Delta R = \frac{H_{tk} \cdot 2H_s}{R_k^{n=1}}$$

In addition, it should be noted that a height of the target object has a bearing on the difference in range between direct and indirect paths, with taller objects having a greater difference than do shorter objects.

FIG. 6 illustrates a graph showing direct path and indirect path velocity evolution over time. As the vehicle approaches the target object, the velocity component of the direct path remains largely unchanged or with a slight change over time. On the other hand, the indirect path (multipath component) experiences a velocity drop as the angle between the radar sensor and the image of the target object becomes larger (i.e., the distance between the radar sensor and the target object becomes smaller).

The information illustrated in FIGS. 4-6 illustrates that a potential multipath signal from a target object is within a determinable range-velocity window that can change over time. This range-velocity window can be utilized to isolate a search function to a predefined region for potential multipath signals from a direct path signal. As shown in the below formula, a range-velocity window size (RVWS) depends upon the range of detection, the height of the sensor, as well as the maximum height needing to be estimated.

$$RVWS = \left( \frac{2H_{Max}H_s}{R_k^n}, \frac{1}{\sqrt{1 + ((H_{Max} + H_s)/R_k^n)^2}} - \frac{1}{\sqrt{1 + ((H_{Max} - H_s)/R_k^n)^2}} \right)$$

Figure 7:
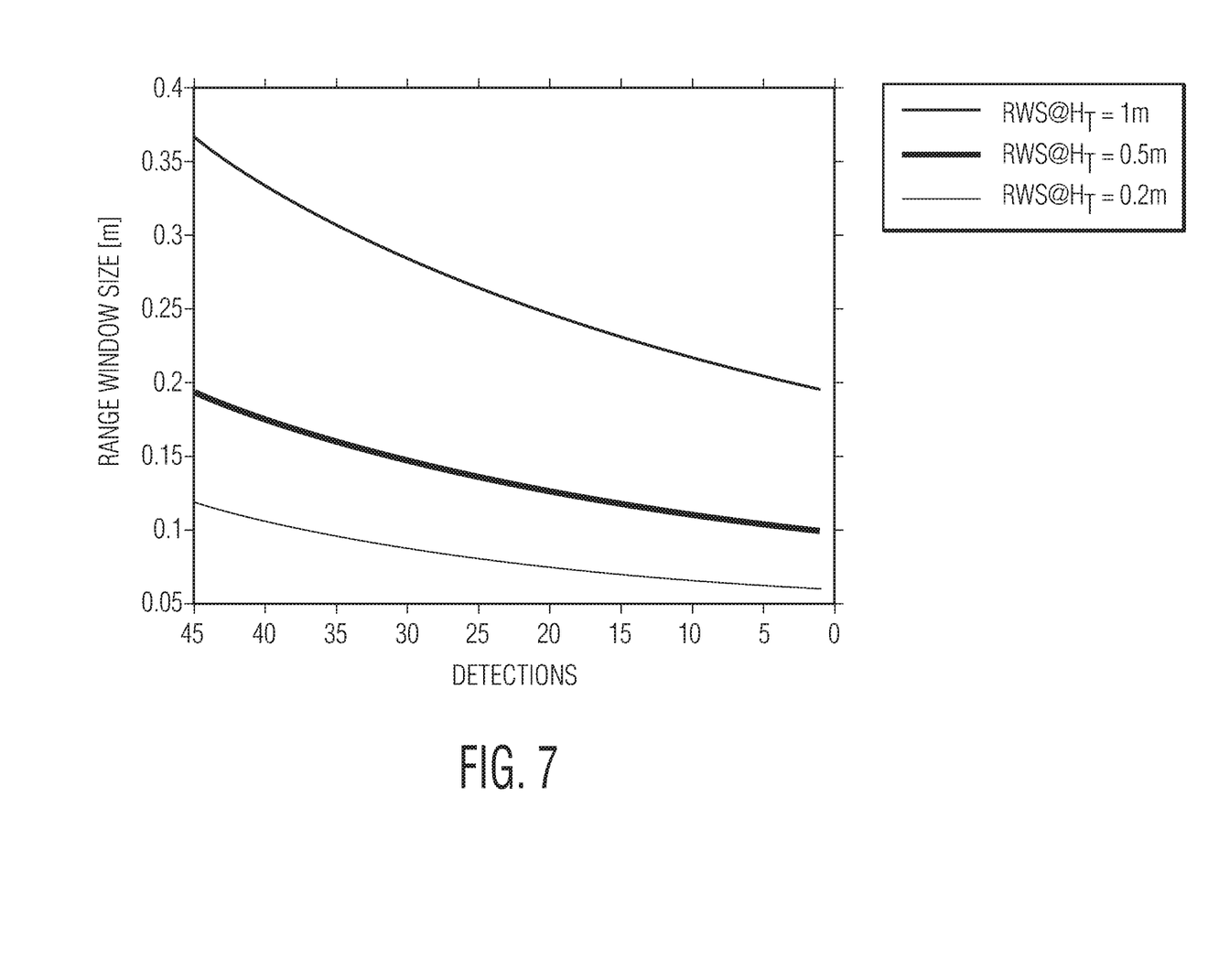
FIGS. 7 and 8 are graphs illustrating an example of how range window size and velocity window size, respectively, change over time.
Figure 8:
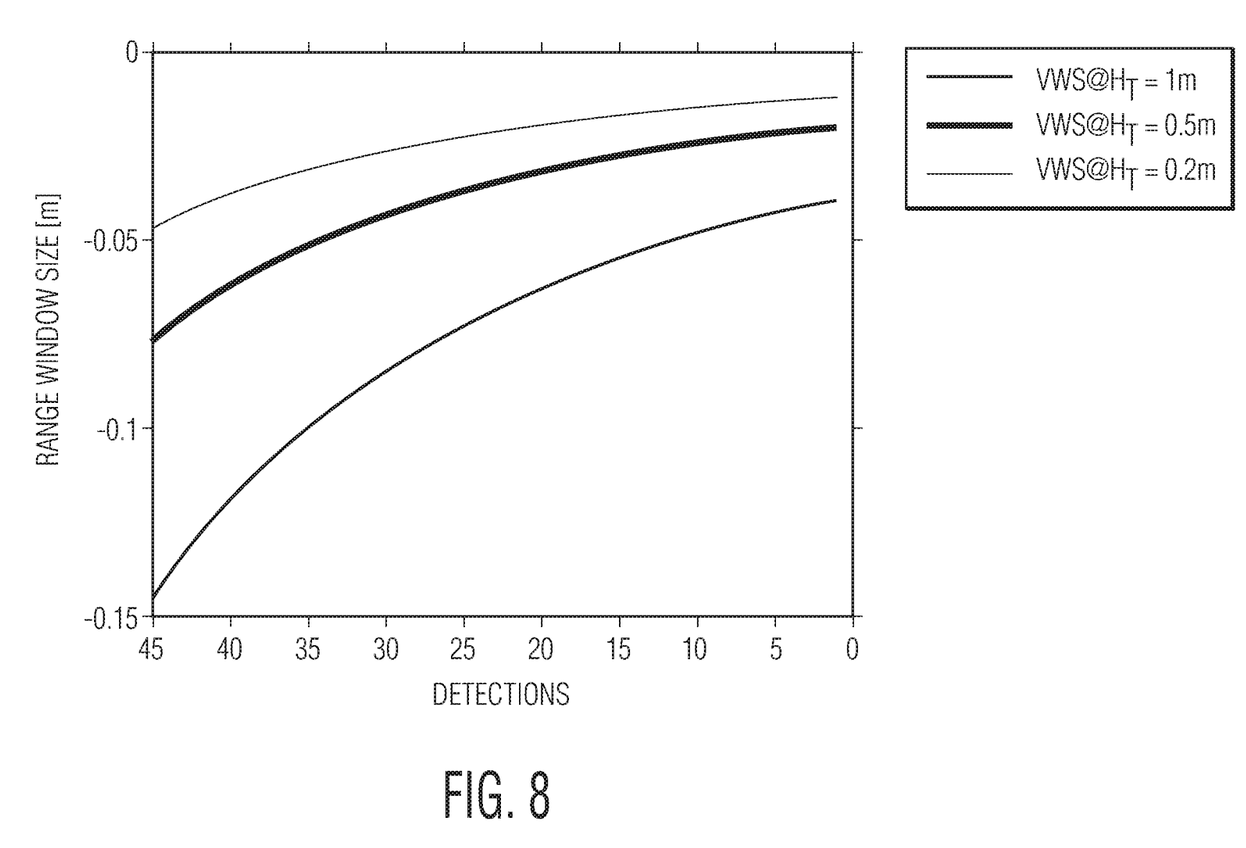

FIGS. 7 and 8 are graphs illustrating an example of how range window size and velocity window size, respectively, change over time.

It should be noted that multipath reflections will have a different range-velocity behavior than the ground itself will provide (e.g., clutter detections). Road surface reflections causing clutter detections will not require a height calculation and can be filtered out from height processing.

As can be seen from the above description, a high-resolution radar sensor can receive and interpret multiple signals from a target object within the radar sensor's range. These signals can be either direct reflection signals or multipath signals reflected off the ground. If there are several target objects in the radar sensors range, then a determination needs to be made of which signals are a result of direct reflection (real objects) and which signals are indirect reflections (ghost objects), and how those signals are associated with one another. Once a determination is made as to whether a signal is direct or multipath, then a mapping of the signals can be cleaned up to only reflect "real" objects. Further, as discussed above, information from the multipath signals can be used for tasks such as height estimation of target objects. Through a use of the calculated RVWS, embodiments of the present invention provide a mechanism for associating multipath signals with a correct direct reflection signal.

Figure 9:
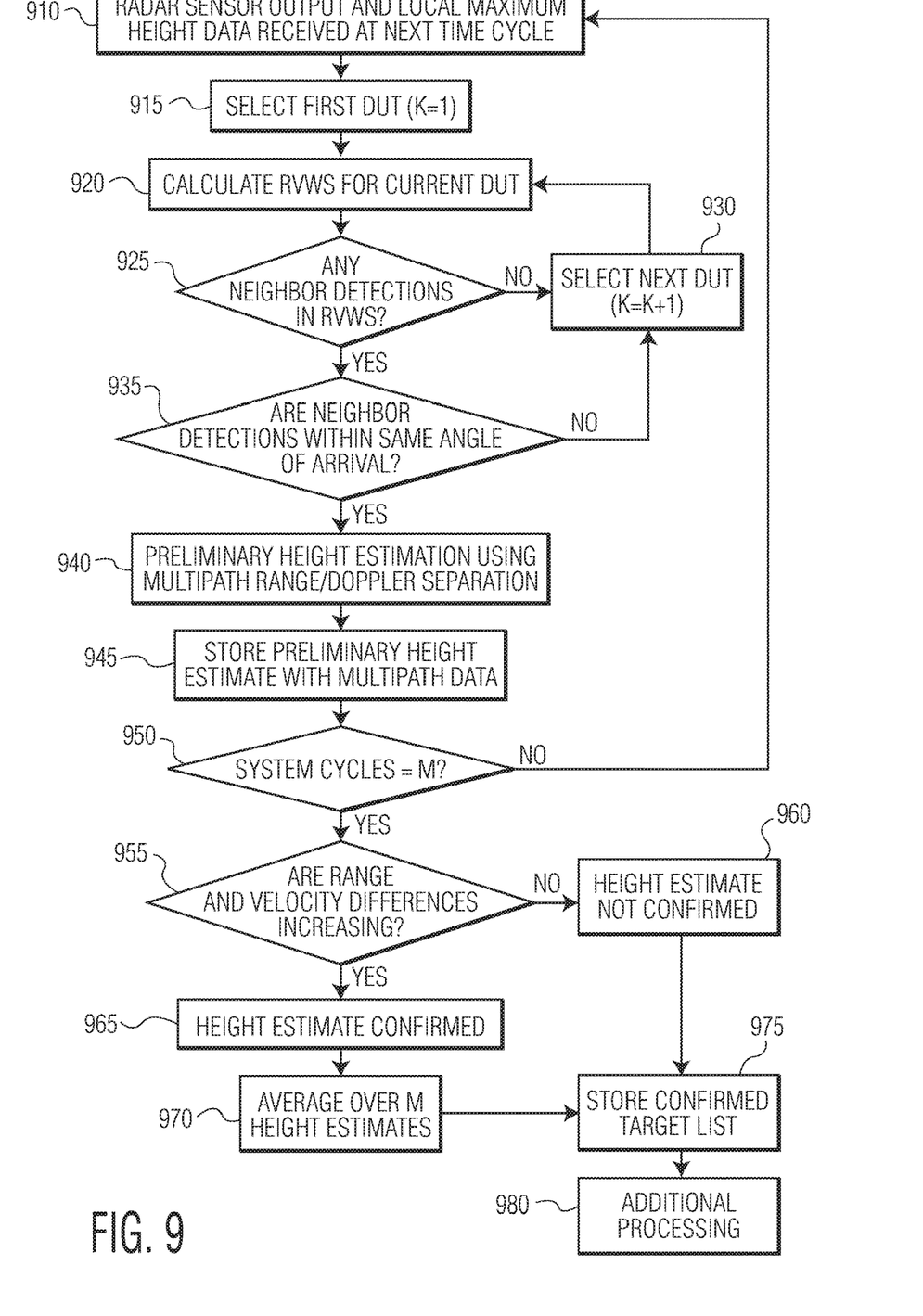
FIG. 9 is a simplified flow diagram illustrating a method that can be implemented by a processor associated with a radar sensor to distinguish between direct reflection signals and multipath signals, and to utilize those signals to provide a height estimation of target objects in a radar sensors field.

FIG. 9 is a simplified flow diagram illustrating a method that can be implemented by a processor associated with a radar sensor to distinguish between direct reflection signals and multipath signals, and to utilize those signals to provide a height estimation of target objects in a radar sensors field.

One embodiment can apply the method to raw data from a radar sensor, but it can be preferable to apply the method to radar information that has been cleaned through a constant false alarm rate (CFAR) filter to help in reducing effects of noise on the radar signal. If the method is applied to a detection after CFAR filtering, a predefined direction of arrival (DOA) threshold can be used to run a DOA check without any restriction imposed by the radar sensor array azimuthal angular resolution. When using CFAR, or Ordered Statistic-CFAR, the filtered output for each radar receive channel will be the input of the below method.

At the first system time cycle, the number of radar detections for each receive channel is individuated. If N is the number of radar detections, k=1, . . . , N represents the detection under test (DUT). Initially, two main data are used: the CFAR output from the radar sensor and information about a local maximum height (910). A first detection under test is selected (k=1) for analysis (915). The range-velocity window size (RVWS) for the detection under test is then determined, using the above equation (920). The RVWS is adaptively calculated considering the actual range of the DUT, as well as the known height of the radar sensor and the local maximum height to be estimated. A determination is then made as to whether there are any neighbor radar detections within the RVWS (925). If there are no neighbor radar detections within the RVWS, then a next detection under test is selected (930) and the system performs a RVWS analysis on that next detection under test.

If there are neighbor radar detections within the RVWS, then a further check on the direction of arrival is performed to verify if the neighbor radar detections are within a predefined angular range in the azimuthal (i.e., horizontal) angle of arrival spectrum (935). This determination can be made by checking if an inner product of the neighbors steering vectors is within the radar sensor's azimuthal angular resolution (e.g., a maximum horizontal plane angular deviation of the radar sensor). If the neighbor radar detections are not within the same azimuthal angle of arrival, then a next detection under test is selected (930) and the system performs a RVWS analysis on that next detection under test.

If the neighbor radar detections are within the same azimuthal angle of arrival, then a preliminary height estimation utilizing the above-described range-Doppler separation techniques is performed (940). The information regarding the detection under test can then be stored in a preliminary target listing, where preliminary height information is associated with determined multipath detections (945).

In order to improve reliable labeling of multipath reflections versus direct reflections, it is preferable to track the detections over a significant number, M, of consecutive system cycles. A predefined statistical confidence should be achieved while ensuring the required time needed to actuate a maneuver from the automated vehicle. This will help to prevent false positive decisions from occurring, especially in a situation where a detection due to a direct reflection (i.e., a real target object) is in a same location as that of a multipath reflection. For example, four cycles can give a reasonable reliability of labeling while at the same time giving a vehicle relying upon the information sufficient time to respond before hitting a target object. If M consecutive system cycles have not been analyzed (950), a next set of filtered radar data is received and analyzed (910). If M consecutive system cycles have been analyzed, then a determination is made if, over the M consecutive cycles, the range and velocity differences between the detection under test and the preliminarily identified multipath is increasing (955). If the range and velocity differences between the detection under test and the preliminarily identified multipath are not increasing if the sensor is approaching the object, then the height of the object cannot be confirmed because the suspected multipath may not be related to the DUT (960). The system will provide all of the detections to a confirmed target list and the previously stored height information will be canceled from the previously determined multipath detections (975).

If the range of velocity differences between the detection under test in the preliminarily identified multipath are increasing as the sensor is approaching the object, then the previously stored height information is confirmed (965). An average can be made of the determined height estimations over the M system cycles (970). The confirmed target list can then include only the detections related to the determined direct path, removing the multipath detection information, but keeping the average height estimation information associated with the direct path entry (975). Additional processing, as desired, can then be performed on the confirmed target list (980). For example, if a coarse elevation estimation is available, then ambiguities regarding whether a target object is above or below a radar sensor height can be resolved.

Figure 10:
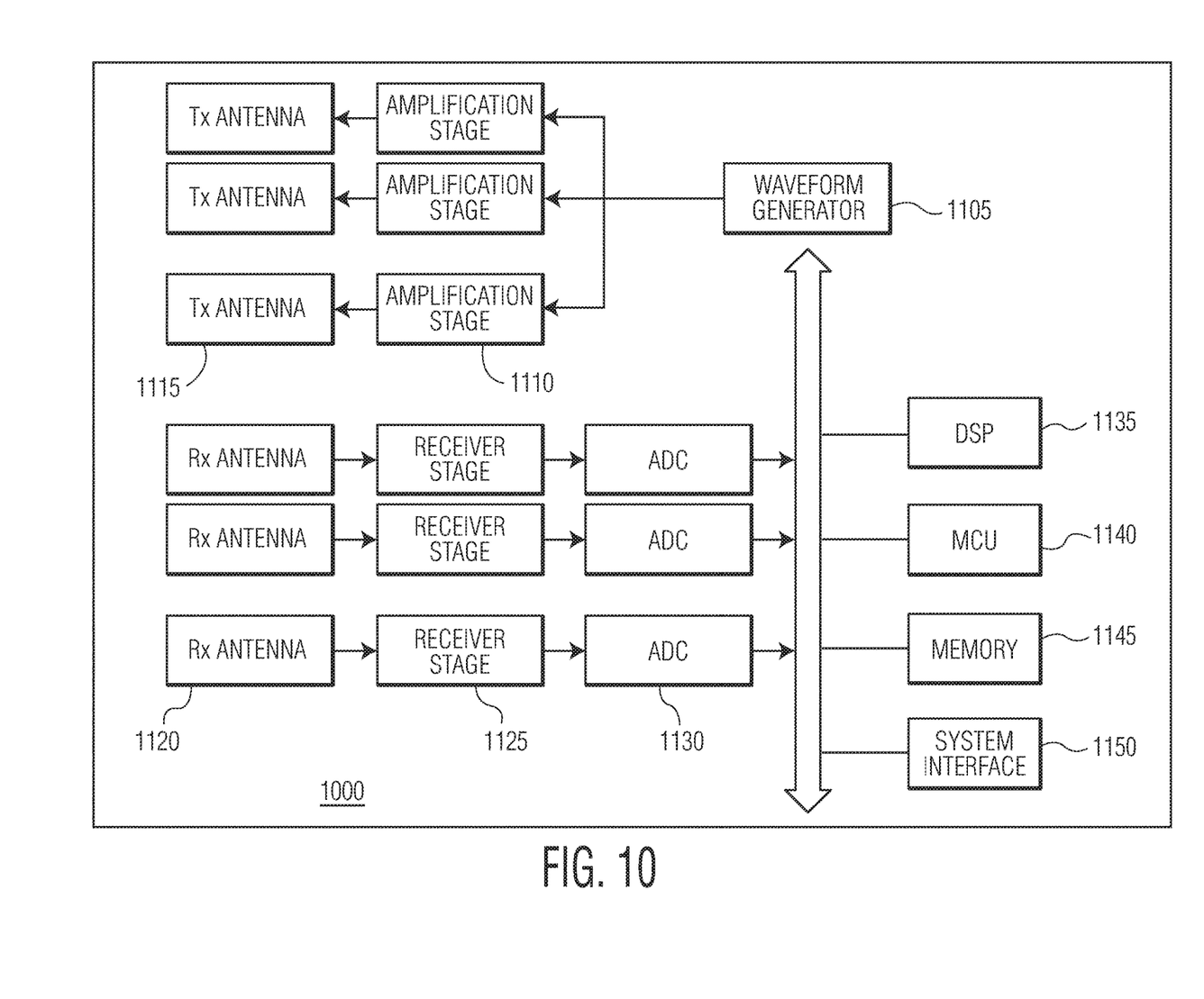
FIG. 10 is a simplified functional diagram illustrating one example of a radar system usable to implement embodiments of the present invention.

FIG. 10 is a simplified functional diagram illustrating one example of a radar system usable to implement embodiments of the present invention. Radar system 1000 includes a waveform generator 1105, and one or more amplification stages 1110 coupled to corresponding radar signal transmit antennas 1115. Radar system 1000 further includes one or more receive antennas 1120 coupled to corresponding receiver stages 1125, which are coupled to corresponding analog-to-digital converters (ADC) 130. ADCs 1130 and waveform generator 1105 are coupled to a digital signal processor (DSP) 1135, a microcontroller unit (MCU) 1140, a memory 1145, and a system interface 1150.

In one embodiment, waveform generator 1105 is configured to generate a continues wave signal with a frequency chirp. The amplification stages 1110 receive and amplify the frequency chirped continuous wave signal. The amplified signal is then radiated by a corresponding transmit antenna 1115 in order to detect objects in the vicinity of the radar system (e.g., target object 120 near vehicle 110).

A reflected signal can be received at one or more of the receive antennas 1120. Receiver stage 1125 can then perform initial processing on the received reflected signal, including, for example, amplifying the received signal, mixing the amplified signal with a current transmit waveform generated by waveform generator 1105, and filtering the signal. The initially processed signal can then be provided to an ADC 1130 to be sampled and converted to a digital signal. DSP 1135 can process the received digital signals to produce various desired measurements of detected objects such as range, relative radial velocity, and angle of arrival, as discussed above. Memory 1145 provides memory to DSP 140 and MCU 1140 to use in order to process the received digital signals. In one embodiment, memory 1145 can store information related to objects detected by the radar system for further processing by the DSP, including the height estimation calculations discussed above. System interface 1150 provides an external interface that can be used to supply measurement information to other systems (e.g., vehicle automation and safety systems). Radar system 1000 can be implemented on a single integrated circuit or a combination of ICs.

By now it should be appreciated that there has been provided a method for estimating height of a radar detected target object. The method includes selecting a first detection entry from a first plurality of radar detection entries where the first plurality of radar detection entries is generated at a first time step by a radar sensor unit installed on a vehicle, determining a range-velocity window size (RVWS) for the first detection entry, selecting other detection entries within the RVWS for the first detection entry from the first plurality of radar detection entries, determining if the selected other detection entry is within the radar sensor unit's azimuthal angular resolution for the first detection entry for each selected other detection entry, and calculating a first associated preliminary height of an object associated with the selected other detection entry for each selected other detection entry within the radar sensor unit's azimuthal angular resolution.

In one aspect of the above embodiment, the RVWS is dependent upon a range of first detection entry, a height of the radar sensor unit, and a maximum height for estimation. In another aspect, determining if the selected other detection entry is within the radar sensor unit's azimuthal angular resolution further includes determining if an inner product of steering vectors between the first detection entry and the selected other detection entry is within a predetermined azimuthal angular resolution of the radar sensor unit.

In another aspect of the above embodiment, calculating the first associated preliminary height of the object associated with the selected other detection entry further includes calculating a first associated preliminary height using a range difference between the first detection entry and the selected other detection entry, calculating a second associated preliminary height using a velocity associated with the first detection entry and a velocity associated with the selected other detection entry, and averaging between the first associated preliminary height and the second associated preliminary height. In a further aspect, the range difference is due to the selected other detection entry being an indirect reflection of a reflected radar signal from the object. In yet another further aspect, the velocity associated with the first detection entry and the selected other detection entry is determined using Doppler radar techniques. In a further aspect, a difference between the velocity associated with the first detection entry and the velocity associated with the selected other detection entry is due to a difference in angle between the received signals.

In another aspect of the above embodiment, the method further includes selecting a second detection entry from the first plurality of radar detection entries, determining the RVWS for the second detection entry, selecting second other detection entries within the RVWS for the second detection entry from the first plurality of radar detection entries, determining if the selected second other detection entry is within the radar sensor unit's azimuthal angular resolution for the second detection entry for each selected second other detection entry, calculating a second associated preliminary height of an object associated with the selected second other detection entry for each selected second other detection entry within the radar sensor unit's azimuthal angular resolution for the second detection entry.

In still another aspect of the above embodiment, the method further includes: selecting a third detection entry from a second plurality of radar detection entries where the second plurality of radar detection entries are generated at a second time step by the radar sensor unit; determining the RVWS for the third detection entry; selecting third other detection entries within the RVWS for the third detection entry from the second plurality of radar detection entries; determining if the selected third other detection entry is within the radar sensor unit's azimuthal angular resolution for the third detection entry for each selected third other detection entry; and, calculating a third associated preliminary height of an object associated with the second other detection entry for each selected third other detection entry within the radar sensor unit's azimuthal angular resolution for the third detection entry. In a further aspect, the method further includes determining whether the third detection entries associated with the same object as the first detection entry. In still a further aspect, if the third detection entry is associated with the same object as the first detection entry, the method further includes averaging the first associated preliminary height with the third associated preliminary height and storing the average height with the third detection entry.

Another embodiment of the present invention provides a radar sensor unit coupled to a vehicle. The radar sensor unit includes a waveform generator coupled to one or more radar signal transmission antennas, one or more analog-to-digital converters each coupled to a corresponding radar signal reception antenna, a digital signal processor coupled to the one or more ADCs and the waveform generator, and a memory coupled to the digital signal processor. The digital signal processor is configured to select a first detection entry from a first plurality of radar detection entries stored in the memory where the first plurality of radar detection entries is generated at a first time step by the radar sensor unit, determine a RVWS for the first detection entry, select other detection entries within the RVWS for the first detection entry from the first plurality of radar detection entries, for each selected other detection entry determine if the selected other detection entries within the radar sensor unit's azimuthal angular resolution for the first detection entry, and for each selected other detection entry within the radar sensor unit's azimuthal angular resolution calculate a first associated preliminary height of an object associated with the selected other detection entry.

In one aspect of the above embodiment, the digital signal processor is further configured to determine if an inner product of steering vectors between the first detection entry in the selected other detection entry is within a predetermined azimuthal angular resolution of the radar sensor unit in order to detect if the selected other detection entry is within the radar sensor unit's azimuthal angular resolution.

In another aspect of the above embodiment, in order to calculate the first associated preliminary height of the object associated with the selected other detection entry, the digital signal processor is further configured to calculate a first associated preliminary height using a range difference between the first detection entry and the selected other detection entry, calculate a second associated preliminary height using a velocity associated with the first detection entry and a velocity associated with the selected other detection entry, and average between the first associated preliminary height and the second associated preliminary height. In a further aspect, the range difference is due to the selected other detection entry being an indirect reflection of a reflected radar signal from the object. In still a further aspect, the velocity associated with the first section entry and the selected other detection entry is determined using Doppler radar techniques. In yet a further aspect, a difference between the velocity associated with the first detection entry and the velocity associated with the selected other detection entry is due to a difference in angle between the received signals.

In another aspect of the above embodiment, the digital signal processor is further configured to: select a second detection entry from the first plurality of radar detection entries; determine the RVWS for the second detection entries; select second other detection entries within the RVWS for the second detection entry from the first plurality of radar detection entries; for each selected second other detection entry, determine if the selected second other detection entries within the radar sensor unit's azimuthal angular resolution for the second detection entry; and, for each selected second other detection entry within the radar sensor unit's azimuthal angular resolution for the second detection entry, calculate a second associated preliminary height of an object associated with the selected second other detection entry.

In yet another aspect of the above embodiment, the digital signal processor is further configured to: select a third detection entry from the second plurality of radar detection entries where the second plurality of radar detection entries are generated at a second time step by the radar sensor unit; determine the RVWS for the third detection entry; select third other detection entries within the RVWS for the third detection entry from the second plurality of radar detection entries; for each selected third other detection entry, determine if the selected third other detection entries within the radar sensor unit's azimuthal angular resolution for the third detection entry; and, for each selected third other detection entry within the radar sensor unit's azimuthal angular resolution for the third detection entry, calculating a third associated preliminary height of an object associated with the selected second other detection entry. In a further aspect, the digital signal processor is further configured to determine whether the third detection entries associated with the same object is the first detection entry. In still a further aspect, if the third detection entries associated with the same object is the first detection entry, the digital signal processor is further configured to average the first associated preliminary height with third associated preliminary height, and store the average height with the third detection entry in the memory.

Another embodiment of the present invention provides an automotive system including a processor coupled to a network in the automotive system and a radar sensor unit coupled to the network. The radar sensor unit includes a waveform generator coupled to one or more radar signal transmission antennas, one or more analog-to-digital converters each coupled to a corresponding radar signal reception antenna, a digital signal processor coupled to the one or more ADCs and the waveform generator, and a memory coupled to the digital signal processor. The digital signal processor is configured to select a first detection entry from a first plurality of radar detection entries stored in the memory where the first plurality of radar detection entries is generated at a first time step by the radar sensor unit, determine a RVWS for the first detection entry, select other detection entries within the RVWS for the first detection entry from the first plurality of radar detection entries, determine if the selected other detection entries within the radar sensor unit's azimuthal angular resolution for the first detection entry for each selected other detection entry, and calculate a first associated preliminary height of an object associated with the selected other detection entry for each selected other detection entry within the radar sensor unit's azimuthal angular resolution.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

The term "program," as used herein, is defined as a sequence of instructions designed for execution on a computer system. A program, or computer program, may include a subroutine, a function, a procedure, an object method, an object implementation, an executable application, an applet, a servlet, a source code, an object code, a shared library/dynamic load library and/or other sequence of instructions designed for execution on a computer system.

Some of the above embodiments, as applicable, may be implemented using a variety of different information processing systems. For example, although FIG. 10 and the discussion thereof describe an exemplary radar system architecture, this exemplary architecture is presented merely to provide a useful reference in discussing various aspects of the invention. Of course, the description of the architecture has been simplified for purposes of discussion, and it is just one of many different types of appropriate architectures that may be used in accordance with the invention. Those skilled in the art will recognize that the boundaries between logic blocks are merely illustrative and that alternative embodiments may merge logic blocks or circuit elements or impose an alternate decomposition of functionality upon various logic blocks or circuit elements.

Thus, it is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the functionality of the above described operations merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

All or some of the program elements described herein may be received elements of radar system 1000, for example, from computer readable media such as memory 1145 or other media on other computer systems. Such computer readable media may be permanently, removably or remotely coupled to an information processing system such as radar system 1000. The computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc.; and data transmission media including computer networks, point-to-point telecommunication equipment, and carrier wave transmission media, just to name a few.

A computer system processes information according to a program and produces resultant output information via I/O devices. A program is a list of instructions such as a particular application program and/or an operating system. A computer program is typically stored internally on computer readable storage medium or transmitted to the computer system via a computer readable transmission medium. A computer process typically includes an executing (running) program or portion of a program, current program values and state information, and the resources used by the operating system to manage the execution of the process. A parent process may spawn other, child processes to help perform the overall functionality of the parent process. Because the parent process specifically spawns the child processes to perform a portion of the overall functionality of the parent process, the functions performed by child processes (and grandchild processes, etc.) may sometimes be described as being performed by the parent process.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

The term "coupled," as used herein, is not intended to be limited to a direct coupling or a mechanical coupling.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. In a radar sensor unit installed on a vehicle, a method for estimating height of a radar detected target object comprises:
   transmitting a wave signal from a wave generator of the radar sensor unit;
   receiving reflected signals at one or more receive antennas of the radar sensor unit;
   processing the reflected signals to generate radar detection entries and storing the radar detection entries into a memory of the radar sensor unit;
   selecting a first detection entry from a first plurality of radar detection entries stored in the memory, wherein the first plurality of radar detection entries is generated at a first time step by the radar sensor unit;
   determining a range-velocity window size (RVWS) for the first detection entry;
   selecting other detection entries within the RVWS for the first detection entry from the first plurality of radar detection entries;
   for each selected other detection entry, determining if the selected other detection entry is within an azimuthal angular resolution of the radar sensor unit for the first detection entry;
   for each selected other detection entry within the azimuthal angular resolution of the radar sensor unit, calculating a first associated preliminary height of an object associated with the selected other detection entry, wherein said calculating the first associated preliminary height of the object associated with the selected other detection entry further comprises:
      calculating a first associated preliminary height using a range difference between the first detection entry and the selected other detection entry;
      calculating a second associated preliminary height using a velocity associated with the first detection entry and a velocity associated with the selected other detection entry;
      averaging between the first associated preliminary height and the second associated preliminary height.

2. The method of claim 1 wherein the RVWS is dependent upon a range of first detection entry, a height of the radar sensor unit, and a maximum height for estimation.

3. The method of claim 1 wherein said determining if the selected other detection entry is within the radar sensor unit's azimuthal angular resolution further comprises:
   determining if an inner product of steering vectors between the first detection entry and the selected other detection entry is within a predetermined azimuthal angular resolution of the radar sensor unit.

4. The method of claim 1 wherein the range difference is due to the selected other detection entry being an indirect reflection of a reflected radar signal from the object.

5. The method of claim 1 wherein the velocity associated with the first detection entry and the selected other detection entry is determined using Doppler radar techniques.

6. The method of claim 5 wherein a difference between the velocity associated with the first detection entry and the velocity associated with the selected other detection entry is due to a difference in angle between the received signals.

7. The method of claim 1 further comprising:
   selecting a second detection entry from the first plurality of radar detection entries;
   determining the RVWS for the second detection entry;
   selecting second other detection entries within the RVWS for the second detection entry from the first plurality of radar detection entries;
   for each selected second other detection entry, determining if the selected second other detection entry is within the azimuthal angular resolution of the radar sensor unit for the second detection entry;
   for each selected second other detection entry within the azimuthal angular resolution of the radar sensor unit for the second detection entry, calculating a second associated preliminary height of an object associated with the selected second other detection entry.

8. In a radar sensor unit installed on a vehicle, a method for estimating height of a radar detected target object comprises:
   transmitting a wave signal from a wave generator of the radar sensor unit;
   receiving reflected signals at one or more receive antennas of the radar sensor unit;

processing the reflected signals to generate radar detection entries and storing the radar detection entries into a memory of the radar sensor unit;
selecting a first detection entry from a first plurality of radar detection entries stored in the memory, wherein the first plurality of radar detection entries is generated at a first time step by the radar sensor unit;
determining a range-velocity window size (RVWS) for the first detection entry;
selecting other detection entries within the RVWS for the first detection entry from the first plurality of radar detection entries;
for each selected other detection entry, determining if the selected other detection entry is within an azimuthal angular resolution of the radar sensor unit for the first detection entry;
for each selected other detection entry within the azimuthal angular resolution of the radar sensor unit, calculating a first associated preliminary height of an object associated with the selected other detection entry;
selecting a third detection entry from a second plurality of radar detection entries stored in the memory, wherein the second plurality of radar detection entries are generated at a second time step by the radar sensor unit;
determining the RVWS for the third detection entry;
selecting third other detection entries within the RVWS for the third detection entry from the second plurality of radar detection entries;
for each selected third other detection entry, determining if the selected third other detection entry is within the azimuthal angular resolution of the radar sensor unit for the third detection entry; and
for each selected third other detection entry within the azimuthal angular resolution of the radar sensor unit for the third detection entry, calculating a third associated preliminary height of an object associated with the selected second other detection entry.

9. The method of claim 8 further comprising:
determining whether the third detection entry is associated with the same object as the first detection entry.

10. The method of claim 9, wherein if the third detection entry is associated with the same object as the first detection entry, further comprising:
averaging the first associated preliminary height with the third associated preliminary height; and
storing the average height with the third detection entry.

11. The method of claim 8 wherein the RVWS is dependent upon a range of first detection entry, a height of the radar sensor unit, and a maximum height for estimation.

12. The method of claim 8 wherein said determining if the selected other detection entry is within the radar sensor unit's azimuthal angular resolution further comprises:
determining if an inner product of steering vectors between the first detection entry and the selected other detection entry is within a predetermined azimuthal angular resolution of the radar sensor unit.

13. The method of claim 8 further comprising:
selecting a second detection entry from the first plurality of radar detection entries;
determining the RVWS for the second detection entry;
selecting second other detection entries within the RVWS for the second detection entry from the first plurality of radar detection entries;
for each selected second other detection entry, determining if the selected second other detection entry is within the azimuthal angular resolution of the radar sensor unit for the second detection entry;
for each selected second other detection entry within the azimuthal angular resolution of the radar sensor unit for the second detection entry, calculating a second associated preliminary height of an object associated with the selected second other detection entry.

14. A radar sensor unit coupled to a vehicle, the radar sensor unit comprising:
a waveform generator coupled to one or more radar signal transmission antennas;
one or more analog-to-digital converters (ADC) each coupled to a corresponding radar signal reception antenna;
a digital signal processor coupled to the one or more ADCs and the waveform generator; and
a memory, coupled to the digital signal processor, wherein the digital signal processor is configured to
select a first detection entry from a first plurality of radar detection entries stored in the memory, wherein the first plurality of radar detection entries is generated at a first time step by the radar sensor unit,
determine a range-velocity window size (RVWS) for the first detection entry,
select other detection entries within the RVWS for the first detection entry from the first plurality of radar detection entries,
for each selected other detection entry, determine if the selected other detection entry is within the azimuthal angular resolution of the radar sensor unit for the first detection entry, and
for each selected other detection entry within the azimuthal angular resolution of the radar sensor unit, calculate a first associated preliminary height of an object associated with the selected other detection entry, wherein to calculate the first associated preliminary height of the object associated with the selected other detection entry, the digital signal processor is further configured to:
calculate a first associated preliminary height using a range difference between the first detection entry and the selected other detection entry;
calculate a second associated preliminary height using a velocity associated with the first detection entry and a velocity associated with the selected other detection entry; and
average between the first associated preliminary height and the second associated preliminary height.

15. The radar sensor unit of claim 14 wherein to detect if the selected other detection entry is within the azimuthal angular resolution of the radar sensor unit, the digital signal processor is further configured to determine if an inner product of steering vectors between the first detection entry and the selected other detection entry is within a predetermined azimuthal angular resolution of the radar sensor unit.

16. The radar sensor unit of claim 14 wherein the velocity associated with the first detection entry and the selected other detection entry is determined using Doppler radar techniques.

17. The radar sensor unit of claim 14 wherein the digital signal processor is further configured to:
select a second detection entry from the first plurality of radar detection entries;
determine the RVWS for the second detection entry;

select second other detection entries within the RVWS for the second detection entry from the first plurality of radar detection entries;

for each selected second other detection entry, determine if the selected second other detection entry is within the azimuthal angular resolution of the radar sensor unit for the second detection entry;

for each selected second other detection entry within the azimuthal angular resolution of the radar sensor unit for the second detection entry, calculate a second associated preliminary height of an object associated with the selected second other detection entry.

18. A radar sensor unit coupled to a vehicle, the radar sensor unit comprising:

a waveform generator coupled to one or more radar signal transmission antennas;

one or more analog-to-digital converters (ADC) each coupled to a corresponding radar signal reception antenna;

a digital signal processor coupled to the one or more ADCs and the waveform generator; and a memory, coupled to the digital signal processor, wherein the digital signal processor is configured to select a first detection entry from a first plurality of radar detection entries stored in the memory, wherein the first plurality of radar detection entries is generated at a first time step by the radar sensor unit, determine a range-velocity window size (RVWS) for the first detection entry, select other detection entries within the RVWS for the first detection entry from the first plurality of radar detection entries, for each selected other detection entry, determine if the selected other detection entry is within the azimuthal angular resolution of the radar sensor unit for the first detection entry, for each selected other detection entry within the azimuthal angular resolution of the radar sensor unit, calculate a first associated preliminary height of an object associated with the selected other detection entry, select a third detection entry from a second plurality of radar detection entries, wherein the second plurality of radar detection entries are generated at a second time step by the radar sensor unit;

determine the RVWS for the third detection entry;

select third other detection entries within the RVWS for the third detection entry from the second plurality of radar detection entries;

for each selected third other detection entry, determine if the selected third other detection entry is within the azimuthal angular resolution of the radar sensor unit for the third detection entry; and for each selected third other detection entry within the azimuthal angular resolution of the radar sensor unit for the third detection entry, calculate a third associated preliminary height of an object associated with the selected second other detection entry.

19. The radar sensor unit of claim 18 wherein the digital signal processor is further configured to determine whether the third detection entry is associated with the same object as the first detection entry.

20. The radar sensor unit of claim 19, wherein if the third detection entry is associated with the same object as the first detection entry, the digital signal processor is further configured to average the first associated preliminary height with the third associated preliminary height; and store the average height with the third detection entry in the memory.

21. The radar sensor unit of claim 18 wherein to detect if the selected other detection entry is within the azimuthal angular resolution of the radar sensor unit, the digital signal processor is further configured to determine if an inner product of steering vectors between the first detection entry and the selected other detection entry is within a predetermined azimuthal angular resolution of the radar sensor unit.

22. The radar sensor unit of claim 18 wherein the digital signal processor is further configured to:

select a second detection entry from the first plurality of radar detection entries;

determine the RVWS for the second detection entry;

select second other detection entries within the RVWS for the second detection entry from the first plurality of radar detection entries;

for each selected second other detection entry, determine if the selected second other detection entry is within the azimuthal angular resolution of the radar sensor unit for the second detection entry;

for each selected second other detection entry within the azimuthal angular resolution of the radar sensor unit for the second detection entry, calculate a second associated preliminary height of an object associated with the selected second other detection entry.

* * * * *